United States Patent
Cormode et al.

(10) Patent No.: US 7,590,657 B1
(45) Date of Patent: Sep. 15, 2009

(54) SYSTEM AND METHOD FOR IDENTIFYING HIERARCHICAL HEAVY HITTERS IN A MULTIDIMENSIONAL ENVIRONMENT

(75) Inventors: Graham Cormode, Summit, NJ (US); Philip Russell Korn, New York, NY (US); Shanmugavelayutham Muthukrishnan, Washington, DC (US); Divesh Srivastava, Summit, NJ (US)

(73) Assignees: AT&T Corp., New York, NY (US); The Regents Rutgers University, New York, NY (US)

( * ) Notice: Subject to any disclaimer, the term of this patent is extended or adjusted under 35 U.S.C. 154(b) by 852 days.

(21) Appl. No.: 11/149,699

(22) Filed: Jun. 10, 2005

(51) Int. Cl.
*G06F 7/00* (2006.01)
(52) U.S. Cl. .................. 707/104.1; 707/100
(58) Field of Classification Search ........... 707/104.1, 707/100; 370/352, 359.5, 338, 277
See application file for complete search history.

(56) References Cited

U.S. PATENT DOCUMENTS 7,424,489 B1 * 9/2008 Duffield et al. .......... 707/104.1
7,437,385 B1 * 10/2008 Duffield et al. .......... 707/104.1

OTHER PUBLICATIONS

Manku, et al., "Approximate Frequency counts over Data Streams", Proc. 28 th VLDB conference, Hong Kong, China, 2002.*
Graham Cormode et al., "Diamond in the Rough: Finding Hierarchical Heavy Hitters in Multidimensinoal Data", http://www.cs.rutgers.edu/~muthu/h4.pdf, 12, 22 1999.*
"Approximat Frequency Counts over data Streams", Gurmeet Singh Manku etl.*
"Space-Efficient Online computation of Quantile Summaries", Michael Greenwald et al.*
"Online Idenfification of Hierarchical Heavy Hitters: Algorithms, Evaluation, and Applications", Yin Zhang et al.*

* cited by examiner

*Primary Examiner*—Hung T Vy
(74) *Attorney, Agent, or Firm*—Fay Kaplun & Marcin, LLP

(57) ABSTRACT

A method including receiving a plurality of elements of a data stream, storing a multi-dimensional data structure in a memory, said multi-dimensional data structure storing the plurality of elements as a hierarchy of nodes, each node having a frequency count corresponding to the number of elements stored therein, comparing the frequency count of each node to a threshold value based on a total number of the elements stored in the nodes and identifying each node for which the frequency count is at least as great as the threshold value as a hierarchical heavy hitter (HHH) node and propagating the frequency count of each non-HHH nodes to its corresponding parent nodes.

17 Claims, 4 Drawing Sheets

SYSTEM AND METHOD FOR IDENTIFYING HIERARCHICAL HEAVY HITTERS IN A MULTIDIMENSIONAL ENVIRONMENT

INCORPORATION BY REFERENCE

The entire disclosure of U.S. patent application Ser. No. 10/802,605, entitled "Method and Apparatus for Identifying Hierarchical Heavy Hitters in a Data Stream" filed Mar. 17, 2004 is incorporated, in its entirety, herein. The entire disclosure of U.S. Provisional Patent Appln. 60/560,666, entitled "Diamond in the Rough: Finding Hierarchical Heavy Hitters in Multi-Dimensional Data" filed Apr. 8, 2004 is incorporated, in its entirety, herein.

BACKGROUND

Aggregation along hierarchies is a critical data summarization technique in a large variety of online applications, including decision support (e.g, online analytical processing (OLAP)), network management (e.g., internet protocol (IP) clustering, denial-of-service (DoS) attack monitoring), text (e.g., on prefixes of strings occurring in the text), and extensible markup language (XML) summarization (i.e., on prefixes of root-to-leaf paths in an XML data tree). In such applications, data is inherently hierarchical and it is desirable to monitor and maintain aggregates of the data at different levels of the hierarchy over time in a dynamic fashion.

A heavy hitter (HH) is an element of a data set having a frequency which is greater than or equal to a user-defined threshold. A conventional algorithm for identifying the HHs in the data set maintains a summary structure which allows the frequencies of the elements to be estimated within a pre-defined error bound. The conventional HH algorithm, however, did not account for any hierarchy in the data set. It is also possible to store information for each node in a hierarchy and calculate HHs based on this information. However, the storing of data for all nodes and the amount of calculation is prohibitive. In addition, this method provides superfluous results. A need exists for identifying hierarchical heavy hitters ("HHHs") in data sets having multiple dimensions.

SUMMARY OF THE INVENTION

A method including receiving a plurality of elements of a data stream, storing a multi-dimensional data structure in a memory, said multi-dimensional data structure storing the plurality of elements as a hierarchy of nodes, each node having a frequency count corresponding to the number of elements stored therein, comparing the frequency count of each node to a threshold value based on a total number of the elements stored in the nodes and identifying each node for which the frequency count is at least as great as the threshold value as a hierarchical heavy hitter (HHH) node and propagating the frequency count of each non-HHH nodes to its corresponding parent nodes.

A system which includes a receiving element receiving a plurality of elements of a data stream, a storage element storing a multi-dimensional data structure in a memory, said multi-dimensional data structure storing the plurality of elements as a hierarchy of nodes, each node having a frequency count corresponding to a number of elements stored therein, a comparator element comparing the frequency count of each node to a threshold value based on a total number of the elements stored in the nodes, wherein, when the frequency count is at least as great as the fraction, the node is identified as a hierarchical heavy hitter (HHH) node and a propagation element propagating the frequency count of each non-HHH node to its corresponding parent nodes.

A computer readable storage medium including a set of instructions executable by a processor, the set of instructions operable to receive a plurality of elements of a data stream, store a multi-dimensional data structure in a memory, said multi-dimensional data structure storing the plurality of elements as a hierarchy of nodes, each node having a frequency count corresponding to a number of elements stored therein, compare the frequency count of each node to a threshold value based on a total number of the elements stored in the plurality of nodes, wherein, when the frequency count is at least as great as the threshold value, the node is identified as a hierarchical heavy hitter (HHH) node and propagate the frequency count of each non-HHH node to its corresponding parent nodes.

DETAILED DESCRIPTION

Figure 1:
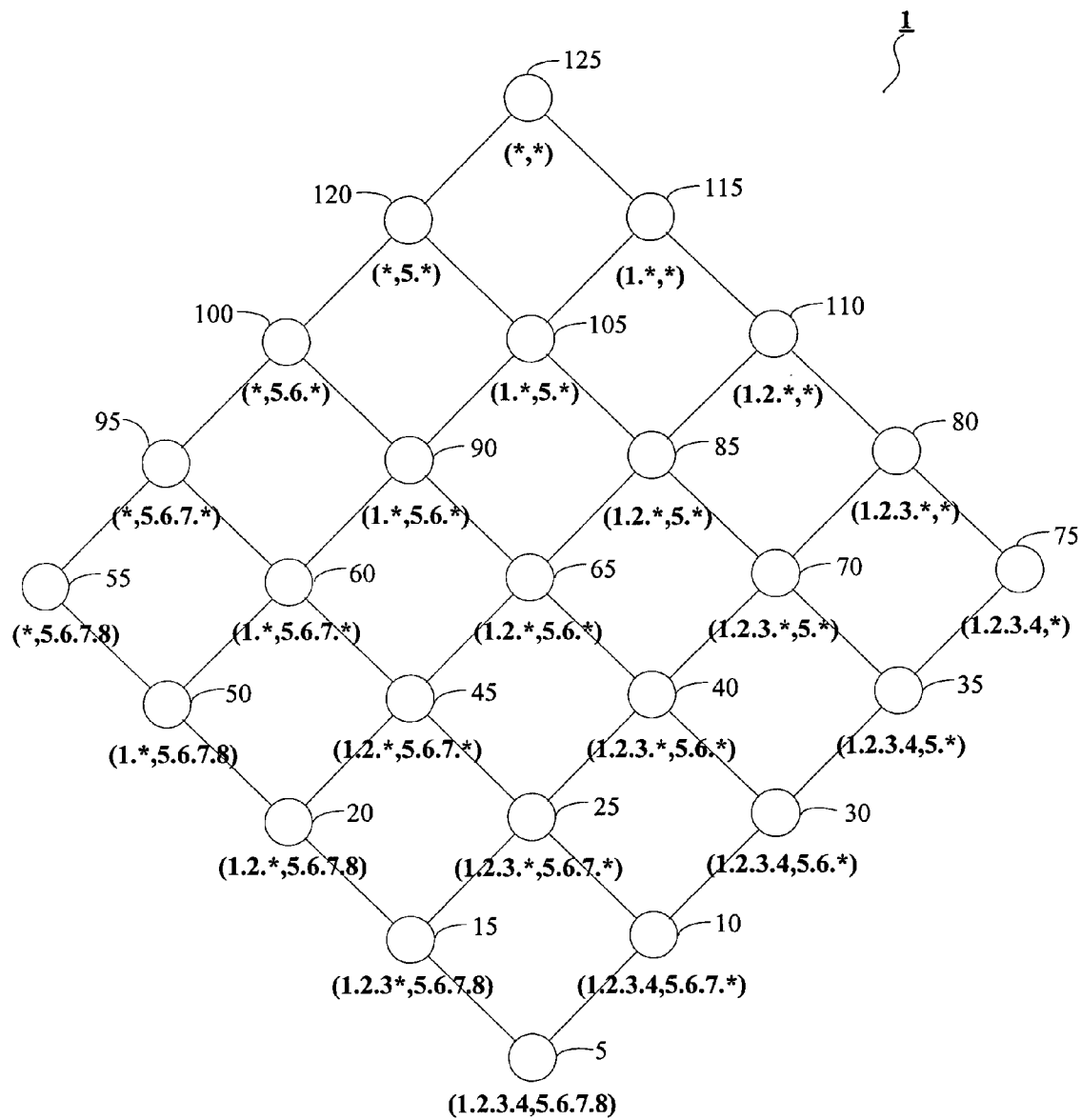
FIG. 1 shows an exemplary two-dimensional ("2-D") data structure.

The present invention may be further understood with reference to the following description and the appended drawings, wherein like elements are referred to with the same reference numerals. The exemplary embodiment of the present invention describes a method for identifying hierarchical heavy hitters ("HHHs") in a multidimensional data structure. The multidimensional data structure and methods for identifying the HHHs therein will be discussed in detail below.

In the exemplary embodiments, the exemplary hierarchical data is described as data representing IP addresses in IP traffic data. The IP addresses are by their nature hierarchical, i.e., each individual address is arranged into subnets, which are within networks, which are within the IP address space. Therefore the collection of multiple data points based on IP addresses, and the generalization of these IP addresses, will result in a hierarchical data structure. The concept of generalization will be described in greater detail below.

However, those of skill in the art will understand that the use of IP addresses is only exemplary and that the present invention may be applied to any type of data which may be represented hierarchically. Other examples of hierarchical data include data collected based on time (e.g., hour, day, week, etc.) or data collected based on location (e.g., city, county, state, etc.). This type of data may also be stored, arranged and viewed in a hierarchical manner.

The hierarchical data may be static or streamed data and the exemplary embodiments of the present invention may be applied to either static or streamed data. For example, the data collected in the IP traffic scenario may be considered streaming data because new data points are continually being added to the set of data points in the data structure. Thus, determining HHHs may be continuous as the data changes. However, it is also possible to take a snapshot of the data at a particular point in time (static data) and perform the HHH analysis on this static data. An example of static hierarchical data may be sales information which is based on time and location. This information may be collected and stored for analysis at a later time. Again, there are any number of examples of hierarchical data that may be streaming, static or either depending on the data collection methods.

The general purpose of collecting and storing this data is to mine the data to determine patterns and information from the data. For example, if a specific IP address (or range of IP addresses in the hierarchy) is receiving an unusually high amount of traffic, this may indicate a denial of service attack on the network. In another example, a specific region may show a high number of sales at a particular time indicating that additional salespeople should be staffed at these times. These high traffic points or paths will be indicated by identifying HHHs in the data structure.

U.S. patent application Ser. No. 10/802,605, entitled "Method and Apparatus for Identifying Hierarchical Heavy Hitters in a Data Stream" filed Mar. 17, 2004 which is incorporated by reference, in its entirety, herein, describes exemplary methods for identifying HHH's in a one-dimensional hierarchical data structure. The exemplary embodiment of the present invention is directed at identifying HHHs in multi-dimensional data structures. These multi-dimensional data structures present problems for identifying HHHs that are not present in a one-dimensional data structure. For example, one-dimensional data structures do not present the issue of common ancestors that multi-dimensional data structures present (e.g., a child node having two parent nodes with one common grandparent node). The exemplary embodiments will provide solutions for the unique issues presented for identifying HHHs in multi-dimensional data structures.

Initially, FIG. 1 shows an exemplary two-dimensional ("2-D") data structure 1 for which exemplary embodiments of the present invention may be used to determine HHHs. The description of data structure 1 will include terminology and notations that are presented in the formulations that follow. The exemplary 2-D data structure 1 may be used to model two dimensional data associated with IP traffic data. In this example, the data is considered two dimensional because there are two attributes which are being used to populate the data structure, i.e., the source address and the destination address. Those of skill in the art will understand that additional dimensions may be added to the data structure by collecting and storing additional information. For example, if the port numbers associated with the source and destination addresses and a time attribute were collected and stored, a data structure with five (5) dimensions could be created. Thus, even though described with reference to a 2-D data structure, the exemplary embodiments of the present invention may be applied to any multi-dimensional data structure.

A typical 32 bit source and destination IP address is in the form of "xxx.xxx.xxx.xxx" with each octet (8 bits) of data (e.g., xxx) representing a sub-attribute of the attribute. Thus, in the example of data structure 1, each level of the hierarchy may be considered to correspond to an octet of the IP address, wherein the source address attribute is represented as 1.2.3.4 and the destination address attribute is represented as 5.6.7.8.

The data structure 1 models the collected data as N d-dimensional tuples. A tuple refers to a collection of one or more attributes. As shown in FIG. 1, each node 5-125 of data structure 1 is a tuple. Thus, throughout this description, the terms node and tuple may be used interchangeably to describe a collection of one or more attributes. The maximum depth of the ith dimension is defined as $h_i$. In this example, N is the total number of data points collected (e.g., the number of hits for the particular source/destination nodes in the data structure), d=2 for the two dimensional attribute data (e.g., source address, destination address) and h1=h2=4 since each of the attributes have four sub-attributes.

The generalization of any element on an attribute means that the element is rolled up one level in the hierarchy of that attribute. For example, the generalization of the IP address pair 1.2.3.4, 5.6.7.8 (shown as node 5) on the second attribute is 1.2.3.4, 5.6.7.* (shown as node 10). An element is fully general on an attribute if it cannot be generalized further. In the data structure 1, this generalization is denoted by the symbol *. For example, the pair *, 5.6.7.* (shown as node 95) is fully general on the first attribute, but not the second. The root node 125 is fully general. Thus, the act of generalizing over a defined set of hierarchies generates a hierarchical lattice structure as shown by data structure 1.

Each node in the data structure 1 may be labeled with a vector length d whose ith entry is a non-negative integer that is at most $h_i$, indicating the level of generalization of the node. For example, the pair (1.2.3.4, 5.6.7.8) is at a generalization level [4,4] (node 5), the pair (*, 5.6.7.*) is at [0,3] (node 95) and the pair (1.2.*, 5.*) is at [2,1] (node 85). The parents of any node are those nodes where one attribute has been generalized in one dimension. For example, the parents of a node at level [4,4] (node 5) are at levels [3,4] (node 15) and [4,3] (node 10). A node that has one attribute that is fully generalized will only have a single parent, e.g., node 95 at level [0,3] has only one parent node 100 at level [0,2] because the first attribute is fully generalized. For notation purposes, a parent of any element e may be referred to as par(e).

Two nodes are comparable if every attribute and the specified portion of the label of one node is a prefix of the other on every attribute. For example, a node having level [3,4] is comparable to a node having level [3,2]. In contrast, a node at level [3,4] is not comparable to a node at level [4,3]. A Level (i) is the ith level in the data structure corresponding to the sum of the values in the level label. For example, Level(8)= [4,4] (node 5); Level(5)=[1,4] (node 50), [2,3] (node 45), [3,2] (node 40) and [4,1] (node 35); and Level(0)=[0,0] (node 125). No pair of nodes with a distinct label in a particular level (e.g., Level(5)) are comparable. These nodes are described as forming an anti-chain. Other nodes which are not comparable can also form an anti-chain. For example, consider labels [2,2] and [1,4] with prefixes (1.2.*, 5.6.*) and (1.*, 5.6.7.8), respectively. The total number of levels in any data structure is given by $L=1+\Sigma_i h_i$. Thus, in the example of data structure 1, L=1+4+4=9.

Finally, a sub-lattice of an element (e) is defined as the set of elements which are related to e under the closure of the parent relation. For example, elements (1.2.3.4, 5.6.7.8), (1.2.3.8, 5.6.4.5) and (1.2.3*, 5.6.8.*) are all in sub-lattice (1.2.3.*, 5.6.*). Thus, the sub-lattice of a set of elements P is defined as sub-lattice(P)=$\cup_{p \in P}$sub-lattice(p). It should be noted that in the above example, element (1.2.3.8, 5, 6.4.5) is in a sub-lattice of (1.2.3.*, 5.6.*) and (1.2.3.*, 5.6.8.*) is in a sub-lattice of (1.2.3.*, 5.6.*), but (1.2.3.8, 5.6.4.5) and (1.2.3.*, 5.6.8.*) are in separate sub-lattices.

As elements are collected and nodes are added to the data structure 1, a frequency count is incremented which represents an occurrence of data at the node. The general problem of finding HHHs is to find all items in the structure whose frequency count exceeds a given fraction ϕ of the total data points. In a one-dimensional data structure, the propagation of frequency counts is fairly straightforward, i.e., add the count of a rolled up node to its one and only parent. However, in the multi-dimensional case, it is not readily apparent how to compute the frequency counts at various nodes within the data structure 1 because, for example, each node may have two or more parents.

In a first exemplary embodiment, referred to as the overlap case, the frequency count for any child node is passed to all its parents, except where the child node has been identified as an HHH. However, as will be described in greater detail below, there are subtleties to the overlap case which prevents overcounting due to the roll up of frequency counts to both parents. In the overlap case, an HHH is defined as follows:

Given a set S of elements e having corresponding frequency counts $f_e$ and $L=\Sigma_i h_i$. An HHH may be defined inductively based on a threshold $\phi$. $HHH_L$ contains all heavy hitters e∈S such that $f_e \geq \lfloor \phi N \rfloor$. The overlap count of an element p at Level(1) in the lattice where 1<L is given by $f'(p)=\Sigma f_e$:e∈S∩{sub-lattice(p)−Sub-lattice $(HHH_{1+L})$}. The set $HHH_1$ is defined as the set $HHH_{1+L} \cup \{p \in Level(1)\hat{\ }f'(p)\} \geq \lfloor \phi N \rfloor$. The HHHs in the overlap case for the set S is the set $HHH_0$.

The methods described herein may be implemented on any computing device which samples and/or processes data in an online or offline state. For example, the computing device may include a central processing unit (CPU), a memory, an input/output (I/O) interface, etc. The I/O interface may be adapted to receive a data stream from a source, such as a network, database, server, etc. The memory may store all or portions of one or more programs and/or data to implement the described methods. In addition, the methods may be implemented in hardware, software, or a combination thereof.

Figure 3:
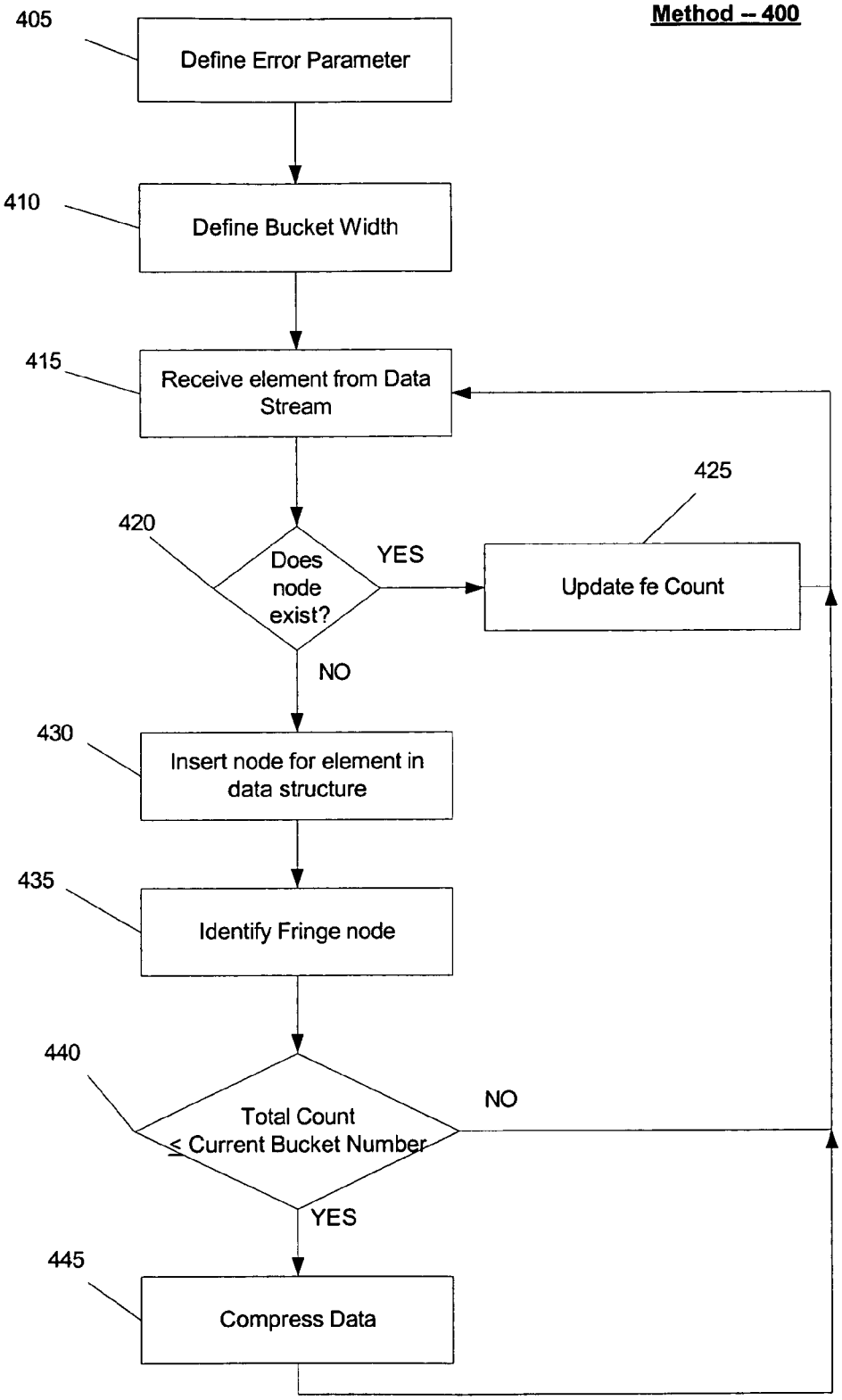
FIG. 3 shows an exemplary method for inserting and compressing data elements in a summary data structure for identifying HHHs in a data structure implementing the overlap case for streaming data according to the present invention.

FIG. 3 shows an exemplary method 400 for inserting and compressing data elements in a summary data structure for identifying HHHs in a data structure implementing the overlap case for streaming data. As would be understood by those of skill in the art, streaming data means that new data will be continuously added to the data set. Thus, for a streaming case, it is very important that any methods for determining HHHs have a minimal processing time so that the results are current. In addition, since new data is being continuously added, the method 400 compresses the data to eliminate certain data which may be omitted for the purposes of calculating the set of HHHs. While it is possible to maintain multiple independent data structures and information for every label in a lattice data structure in order to calculate the HHHs for a particular point in the lattice, this becomes very expensive in terms of storage space and computation time.

Thus, the method 400 presents a single data structure that summarizes the whole lattice. This allows for an approximation of the HHHs for the data structure in a single pass (within a defined error amount). The method 400 uses a very small amount of storage space and updates the set of HHHs as the data stream unravels. More specifically, a summary structure T consisting of a set of nodes that correspond to samples from the input stream is maintained. Each node $t_e \in T$ consists of an element e from the lattice and a bounded amount of auxiliary information.

In the 2-D summary data structure example, auxiliary information $f_e$, $\Delta_e$, $g_e$ and $m_e$ are maintained, where:

$f_e$ is a lower bound on the total count that is straightforwardly rolled up (directly or indirectly) into e, $\Delta_e$ is the difference between an upper bound on the total count that is straightforwardly rolled up into e and the lower bound $f_e$, $g_e$ is an upper bound on the total compensating count, based on counts of rolled up grandchildren of e, and $m_e = \max(f_{d(e)} - g_{d(e)} + \Delta_{d(e)})$, over all descendants d(e) of e that have been rolled up into e.

Referring to FIG. 3, the method 400 begins with step 405 where the user supplies an error parameter ε. As described above, the method 400 will take one pass through the summary data structure and approximate the HHHs for the streamed data using a minimal amount of storage space and computation time. The approximation of the HHHs is based on the user supplied error parameter. From the following description and formulations, those of skill in the art will understand that as a user specifies tighter error tolerances, the storage space and computation time requirements may increase. Each user will select an error parameter that suits the particular application. In step 410, the input stream is conceptually divided into buckets of width (w=⌈1/ε⌉). The current bucket number is defined as $b_{current} = \lfloor \varepsilon N \rfloor$.

The method will then go through two alternating phases of insertion and compression. The following steps are related to the insertion phase. In step 415, an element is received from the data stream. In step 420 it is determined if the node $t_e$ exists for the element in the summary data structure T. If the node $t_e$ exists, the process continues to step 425 where the $f_e$ count of the node is updated and the process loops back to step 415 to retrieve the next element in the stream.

If it was determined in step 420 that the node $t_e$ did not exist, the process continues to step 430 where a new node $t_e$ is created for the element and the auxiliary information $f_e$, $\Delta_e$, $g_e$ and $m_e$ values are stored in the newly created node. Specifically, $f_e$=f of the element, $g_e$ is set to 0 and $\Delta_e = m_e = b_{current} - 1$. However, then the two parent elements (if they exist in the data structure) are also used estimate the values of the auxiliary information. Specifically, if the left parent exists and $m_{lpar(e)} < m_e$, then $\Delta_e = m_e = m_{lpar(e)}$. Similarly, if the right parent exists and $m_{rpar(e)} < m_e$, then $\Delta_e = m_e = m_{rpar(e)}$.

This completes the insertion phase of the method 400. The following is exemplary pseudo code for the insertion process:

```
Insert (e,f):
01   if t_e exists then f_e += f;
02   else {
03      if (lpar(e) in domain) then Insert (lpar(e), 0);
04      if (rpar(e) in domain) then Insert (rpar(e), 0);
05      create t_e with (f_e = f, g_e = 0);
06      Δ_e = m_e = b_current − 1;
07      if (lpar(e) in domain) and (m_lpar(e) < m_e) {
08         Δ_e = m_e = m_lpar(e);}
09      if (rpar(e) in domain) and (m_rpar(e) < m_e) {
10         Δ_e = m_e = m_rpar(e);}}
```

The following steps are related to the compression phase of the method 400. In step 435, fringe nodes are identified. A fringe node is one that does not have any descendants. The compression phase of the method is iterative and is carried out for each of the identified fringe node. For each of the identified fringe nodes, in step 440, it is determined whether the upper bound on the total count is larger than the current bucket number, i.e., is $f_e - g_e + \Delta_e \leq b_{current}$.

If the total count is less than the current bucket number, the fringe node is deleted as part of the compression step 445. However, since the node is deleted, the auxiliary values of the parent elements also need to be updated in the compression step 445. The updating will be described with reference to the left parent, but the same process will be carried out for the right parent. If the left parent exists, the $f_{lpar(e)}$ is updated using the $f_e$ and $g_e$ of the deleted node, i.e. $f_{lpar(e)} += f_e - g_e$. Similarly, $m_{lpar(e)}$ is updated in the form $m_{lpar(e)} = \max(m_{lpar(e)}, f_e - g_e + \Delta_e)$. Finally, it is determined if the left parent has become a fringe node as a result of the deletion of the originally scanned node. If it has become a fringe node, it will be an analyzed node in the iterative compression phase. As described above, the same process will be carried out for the right parent. In addition, the compression step also reduces the compensating count of the common grandparent ($g_{gpar(e)}$) by the value $f_e - g_e$ to account for possible overcounting.

For non-fringe nodes in the summary structure T, the compensating count $g_e$ is speculative and is not taken into account for estimating the upper bound on the total count (e.g., upper bound=$f_e + \Delta_e$). However, for fringe nodes of the summary structure, $g_e$ is no longer speculative and a tighter upper bound can be obtained using $f_e - g_e + \Delta_e$. As described above, it is this tighter upper bound that is used to determine the fringe nodes to be compressed.

Figure 2A:
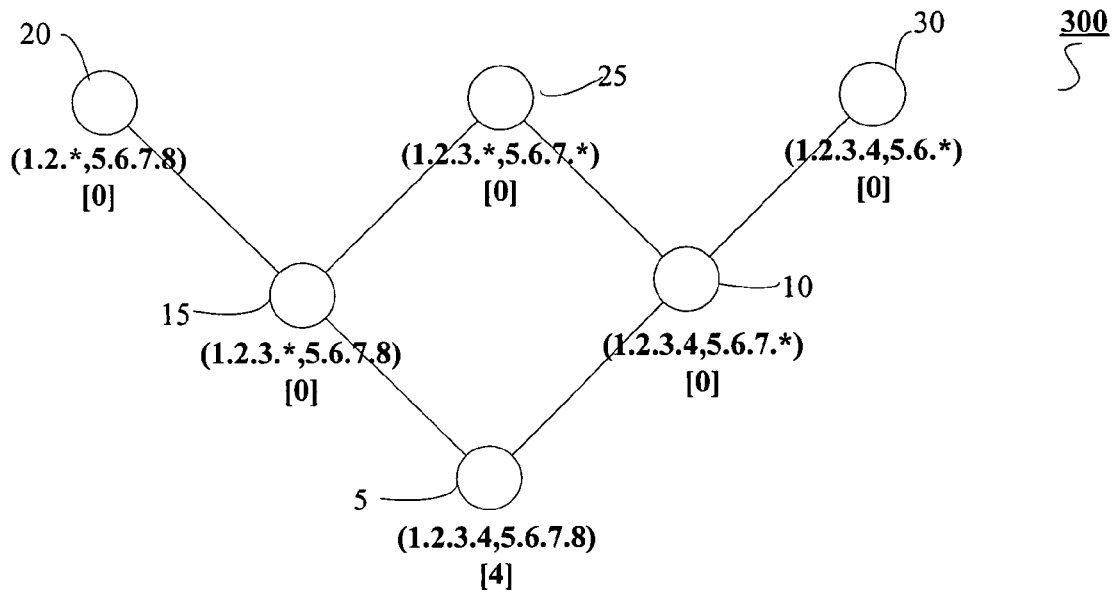
FIGS. 2A-B shows an exemplary embodiment of a portion of a data structure for the purpose of demonstrating an exemplary frequency count propagation according to the present invention.
Figure 2B:
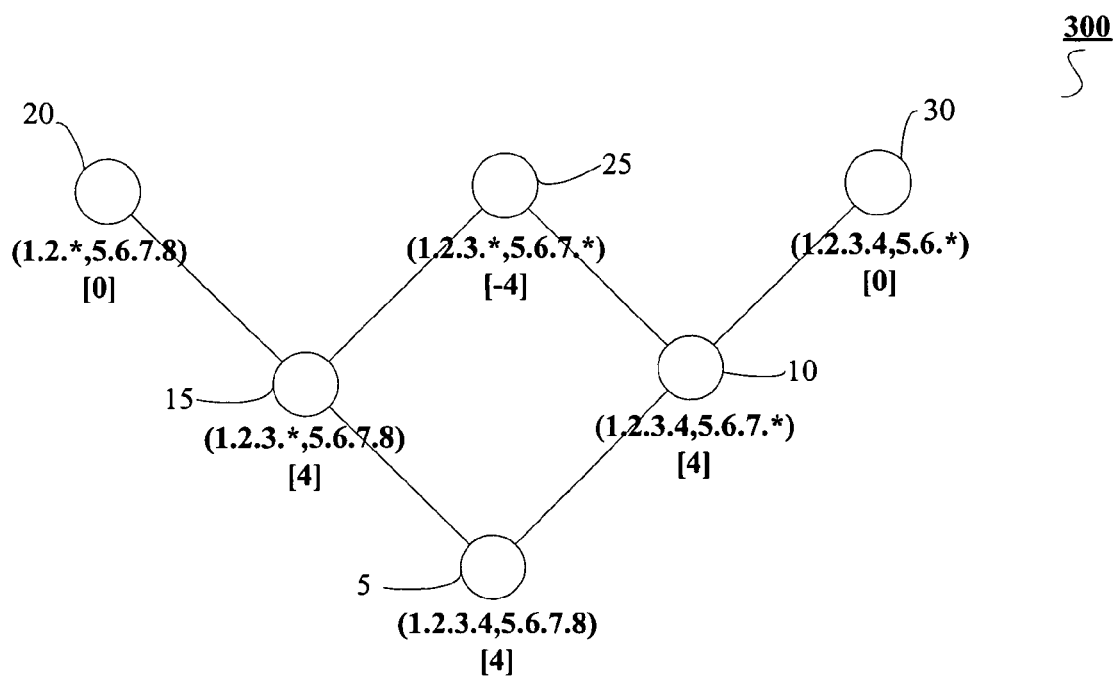

FIGS. 2A-2B depict a portion 300 of the 2-D data structure 1 initially shown in FIG. 1. The portion 300 will be used to show an example of propagating frequency counts in the compression phase of the streaming overlap case. The portion 300 of the data structure 1 shows a diamond property that is a region of the lattice corresponding to an inclusion-exclusion principle to prevent overcounting frequency counts. The example shows the principle of having a compensating count $g_e$ for the common grandparent depicted at the top of the diamond structure. For the purpose of this example, the node 5 of portion 300 in FIGS. 2A-B will be referred to as a child node, nodes 10 and 15 will be referred to as parent nodes and nodes 20-30 will be referred to as grandparent nodes with node 25 being referred to as the common grandparent node.

As shown in FIG. 2A, the exemplary frequency count [4] of the child node 5. As described above, this frequency count should be propagated to the frequency counts of parent nodes 10 and 15. The initial frequency count [0] (shown in FIG. 2A) of each parent node 10 and 15 becomes [4] (shown in FIG. 2B) after the frequency count [4] from the child node 5 is propagated. It should be noted that the initial frequency count of [0] is only exemplary and may be any value based on the actual monitored data.

However, the frequency count [4] of the child node 5 is also subtracted from the frequency count [0] of the common grandparent node 25. The initial frequency count [0] (shown in FIG. 2A) of the common grandparent node 25 becomes [−4] 25 (shown in FIG. 2B) after the frequency count [4] of the child node 5 is subtracted therefrom. As described above, the [−4] frequency count of the common grandparent node may be considered the compensating count so that when the frequency counts of the parent nodes 10 and 15 are each propagated to the common grandparent node 25, the frequency count will be equal to [4] (−4+4+4=4). Without implementing compensating count, propagation of the frequency count [4] of the child node 5 would result in the frequency count [8] of the common grandparent node 25. This overcounting would lead to erroneous determinations of HHH nodes in the 2-D data structure 1.

This completes the compression phase of the method 400. The following is exemplary pseudo code for the compression process:

| Compress: |
|---|
| 01   for each $t_e$ in fringe do { |
| 02      if($f_e + \Delta_e \leq b_{current}$) { |
| 03         if (lpar(e) in domain) { |
| 04            $f_{lpar(e)} += f_e - g_e$ |

| -continued |
|---|
| Compress: |
| 05            $m_{lpar(e)} = \max (m_{lpar(e)}, f_e - g_e + \Delta_e)$; |
| 06            if (lpar(e) has no more children) { |
| 07               add lpar(e) to fringe; }} |
| 08         if (rpar(e) in domain) { |
| 09            $f_{rpar(e)} += f_e - g_e$ |
| 10            $m_{rpar(e)} = \max (m_{rpar(e)}, f_e - g_e + \Delta_e)$; |
| 11            if (rpar(e) has no more children) { |
| 12               add rpar(e) to fringe; }} |
| 13         if (gpar(e) in domain) $g_{gpar(e)} += f_e - g_e$; |
| 14      deletete te ; }} |

Figure 4:
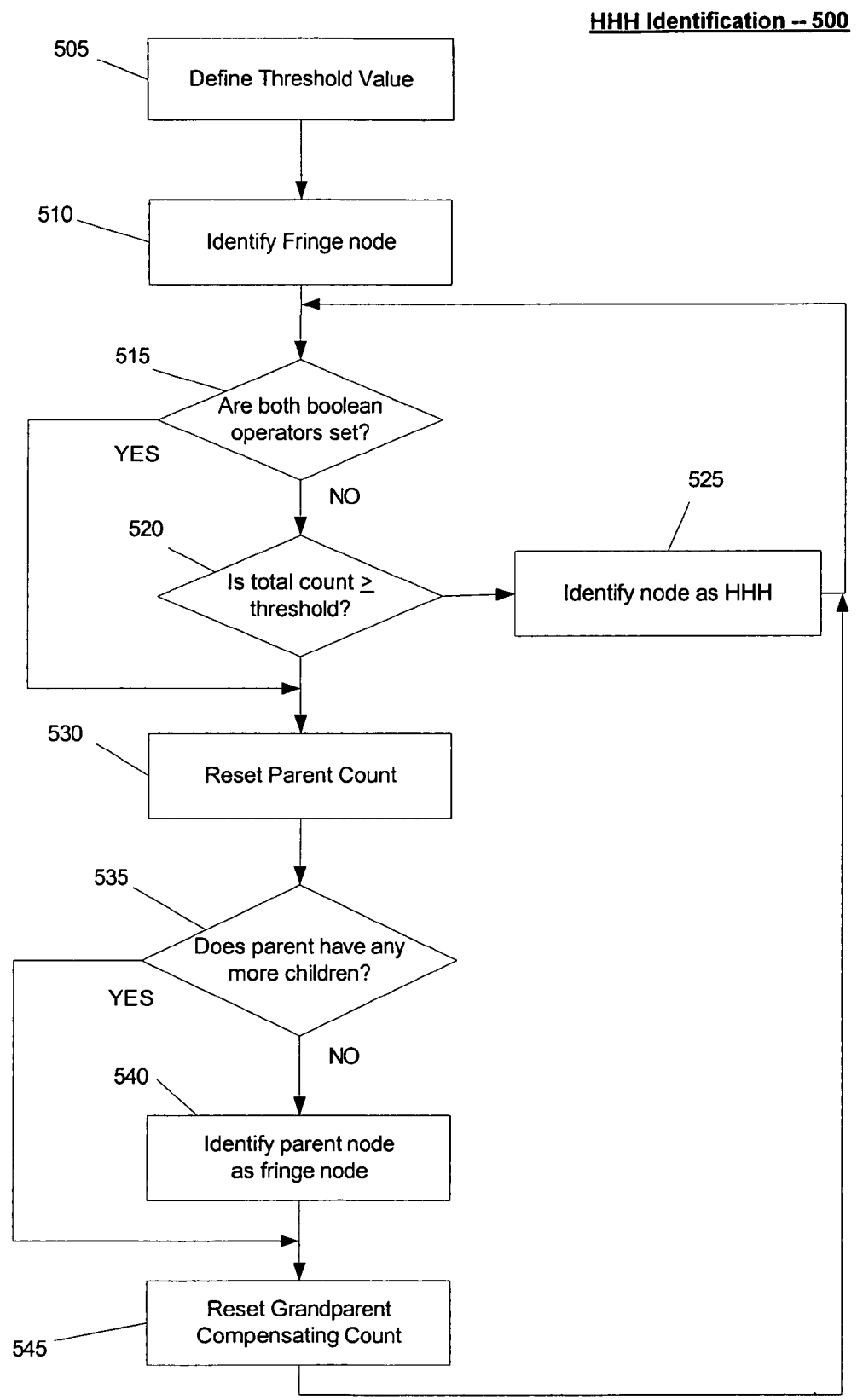
FIG. 4 shows an exemplary method for identifying HHHs in a data structure implementing the overlap case for streaming data according to the present invention.

FIG. 4 shows an exemplary method 500 for identifying HHHs in a data structure implementing the overlap case for streaming data. The method 500 may be used in conjunction with the method 400 to extract HHHs from the summary structure T at any given time. In the initial step 505, the threshold value ($\phi$) for identifying HHHs is defined by the user. In addition, certain parameters are set for each of the elements. Specifically, hhhf$_e$ is set to $f_e$, hhhg$_e$ is set to $g_e$ and two boolean operators identified as lstat(e) and rstat(e) are set to 0 (or not set). The function of lstat(e) and rstat(e) are described in greater detail below.

In step 510, the fringe nodes are identified. Similar to the compression phase of method 400, the remainder of the method 500 is carried out iteratively for all of the identified fringe nodes. In step 515, it is determined if both of the boolean operators lstat(e) and rstat(e) are set. If one or both of the boolean operators are not set, the method continues to step 520 where it is determined if the total count of the node is greater than or equal to the threshold value. The total count for the purposes of identifying an HHH is defined as hhhf$_e$ − hhhg$_e$+$\Delta_e$. If the total count is greater than the threshold value, the node is identified as an HHH in step 525. As part of this identification, the two boolean operators are set. In addition, the HHH node may be printed out or displayed to the user including its auxiliary information. If the node is identified as an HHH in step 525, the process loops back to step 515 to begin processing the next fringe node.

If in step 520 the total count does not exceed the threshold, the process continues to step 530 where the count of the parent nodes are reset. As described above, where a child node is not identified as an HHH, the frequency count will be propagated to the parent nodes. For example, the frequency count of the left parent will be reset based on the following hhhf$_{lpar(e)}$+=max(0, hhhf$_e$−hhhg$_e$). The right parent will be reset in a similar manner.

If in step 515 it was determined that both boolean operators were set, the process skips forward to step 530 where the parent counts are reset. However, it should be noted that the reset value is different than the reset value described immediately above where the boolean operators are not set. The reset value for the parents in the case where the boolean operators are set is hhhf$_{lpar(e)}$+=max(0, hhhf$_e$). Again, the right parent will be reset in a similar manner. As can be seen from the above, when two elements that share a parent are both HHHs, the compensating count at the parent element should not be used because doing so would result in overcompensation. The boolean operators lstat(e) and rstat(e) assure that this will not occur because when both boolean operators are set, the reset value for the parent does not include the compensating count.

After the parent counts have been reset in step 530, the method continues to step 535 where it is determined whether the parent has any additional children. If the parent does not have any additional children, the parent is identified as a fringe node (step 540) and the parent is included as a fringe node to be analyzed in the iterative process. If the parent has additional children (step 535) or after the parent is set as a fringe node (step 540), the method continues to step 545 to reset the common grandparent compensating count. The common grandparent compensating count is reset to $hhhg_{gpar(e)} += \max(0, hhhf_e - hhhg_e)$. The method then continues to iteratively go through all the identified fringe nodes This completes the HHH identification method 500. The following is exemplary pseudo code for the HHH identification method:

| Output (Ø): |
|---|
| 01 let hhhf$_e$ = f$_e$, hhhg$_e$ for all e; |
| 02 let lstat(e) = rstat(e) = 0 for all e; |
| 03 for each t$_e$ in fringe do { |
| 04   if ((⌐lstat(e) or ⌐rstat (e)) and |
| 05   (hhhf$_e$ − hhhg$_e$ + Δ$_e$ ≧ ⌊ϕN⌋)){ |
| 06     print (e, hhhf$_e$ − hhhg$_e$, f$_e$ − g$_e$ , Δ$_e$); |
| 07     lstat(e) = rstat (e) = 1;} |
| 08   else { |
| 09     if (lpar(e) in domain) and |
| 10     (⌐lstat(e) or ⌐rstat (e) ){ |
| 11       hhhf$_{lpar(e)}$ + = max(0, hhhf$_e$ − hhhg$_e$); } |
| 12     else if (lpar(e) in domain) and |
| 13     (lstat(e) and rstat(e)) { |
| 14       hhhf$_{lpar(e)}$ + = max(0, hhhf$_e$ − hhhg$_e$); } |
| 15     if (lpar(e) in domain) { |
| 16       if (lpar(e) has no more children) { |
| 17         addllpar(e) to fringe with |
| 18         lstat(lpar(e)) = lstat(e)); {{ |
| 19     if (rpar(e) in domain) and |
| 20     (⌐lstat(e) or ⌐rstat (e) ){ |
| 21       hhhf$_{rpar(e)}$ + = max(0, hhhf$_e$ − hhhg$_e$); } |
| 22     else if (rpar(e) in domain) and |
| 23     (lstat(e) and rstat(e)) { |
| 24       hhhf$_{rpar(e)}$ + = max(0, hhhf$_e$ − hhhg$_e$); } |
| 25     if (rpar(e) in domain) { |
| 26       if (rpar(e) has no more children) { |
| 27         addlrpar(e) to fringe with |
| 28         lstat(rpar(e)) = lstat(e)); {{ |
| 29     if (gpar(e) in domain) { |
| 30       hhhg$_{gpar(e)}$ + = max(0, hhhf$_e$ − hhhg$_e$); }}} |

The method 500 described above and represented by the above pseudo code computes the HHHs accurately to εN and uses storage space bounded by $O((H/\epsilon)\log(\epsilon N))$. These parameters for the streaming overlap case are similar to a one-dimensional analysis and result in acceptable computation times and storage boundaries As described above, the methods 400 and 500 may be extended to any number of dimensions. In the higher dimensions, a negative compensating count g$_e$(−) (similar to g$_e$ defined above) and a positive compensating count g$_e$(+) are maintained. When an element is compressed, some ancestors obtain negative speculative counts, while others obtain positive speculative counts.

The above methods described the overlap case for streamed data. However, as described above, the present invention may also be used on static data. In the case of static data, computational speed is not as much of a concern because new data is not being added to the data structure. Thus, the method determining HHHs may be iterative and make multiple passes over the data to accurately compute the HHHs. In this case, the error parameter may be set to 0, i.e, ε=0.

In another embodiment, the frequency counts are propagated by splitting the frequency counts of child nodes among the parent nodes, referred to as a split case. For example, referring to FIG. 3A, the frequency count [4] of child node 5 may be split among its parent nodes 10 and 15, (e.g., 4-0, 3-1, 2-2). In this manner, the common grandparent node 25 will only have a frequency count of [4] as a result of the propagation of the frequency counts from the parent nodes 10 and 15. Similar to the overlap case, the split case may also be used for both static and streamed data. The split case results in a simpler determination of HHHs because the splitting of the frequency count resolves the issues related to the overcompensation of common grandparents presented in the overlap case.

The following shows the exemplary pseudo code for the insertion phase, the compression phase and the identification phase for the streaming split case:

| Insert (e,f): |
|---|
| 01 if t, exists then f$_e$ + = f; |
| 02 else { |
| 03   for( i = 1; i ≦ d; i++){ |
| 04     if (par(e, i) in domain) then { |
| 05       Insert (par(e, i), 0); }} |
| 06   create t$_e$ with (f$_e$ = f); |
| 07   Δ$_e$ = m$_e$ = b$_{current}$ − 1; |
| 08   for (i = 1; i ≦ d; i++){ |
| 09     if (par (e, i) in domain) and m$_{par(e,i)}$ < m$_e$) { |
| 10       Δ$_e$ = m$_e$ = m$_{par(e,i)}$; }}} |

| Compress: |
|---|
| 01 for each t$_e$ in fringe do { |
| 02   if f$_e$ + Δ$_e$ ≦ b$_{current}$ { |
| 03     for (i = 1; i ≦ d; i++){ |
| 04       if (par(e, i) in domain) then { |
| 05         f$_{par(e,i)}$ + = s (e,i) * f$_e$ ; |
|          /* s(e,i) is the split function */ |
| 06         m$_{par(e,i)}$ = max (m$_{par(e,i)}$, f$_e$ + Δ$_e$); |
| 07         if (par(e, i) has no more children) { |
| 08           add par (e,i) to fringe; }}} |
| 09   delete t$_e$; }} |

| Output (Ø): |
|---|
| 01 let hhhf$_e$ = f$_e$ for all e; |
| 02 for each t$_e$ in fringe do { |
| 03   if (hhhf$_e$ + Δ$_e$ ≧⌊ØN⌋) { |
| 04     print (e, hhhf e, fe, Δ$_e$); ] |
| 05   else { |
| 06     for (i = 1; i ≦ d; i++) { |
| 07       if (par(e, i) in domain) then { |
| 08         hhhf$_{par(e,i)}$ + = s (e,i) * f$_e$ ; |
| 09         if (par(e,i) has no more children) { |
| 10           add par (e,i) to fringe; }}}}} |

As will be apparent from a review of the exemplary pseudo code, the insertion, compression and identification methods for the split case are similar to the overlap case, except that there is no compensating count.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
receiving a plurality of elements of a data stream;
storing a multi-dimensional data structure in a memory, said multi-dimensional data structure storing the plurality of elements as a hierarchy of nodes, each node having a frequency count corresponding to the number of elements stored therein;

comparing the frequency count of each node to a threshold value based on a total number of the elements stored in the nodes and identifying each node for which the frequency count is at least as great as the threshold value as a hierarchical heavy hitter (HHH) node;

propagating the frequency count of each non-HHH nodes to its corresponding parent nodes identifying each node without a descendant as a fringe node; and deleting each fringe node for which the frequency count is less than a product of an error factor and the total number of the elements stored in the plurality of nodes.

2. The method of claim 1, wherein the frequency count of each HHH node is not propagated to its corresponding parent nodes.

3. The method of claim 1, wherein the multi-dimensional data structure is one of a two-dimensional data structure, a three-dimensional data structure, a four-dimensional data structure and a five-dimensional data structure.

4. The method of claim 1, wherein the frequency count of each node differs from an actual frequency count by less than a specified error factor.

5. The method of claim 1, further comprising:
storing, for each element, auxiliary information including data for propagating the frequency counts.

6. The method of claim 1, wherein a total frequency count of each of the non-HHH nodes is propagated to its corresponding parent node.

7. The method of claim 1, wherein the threshold value is equal to a fraction of the total number of elements stored in the plurality of nodes.

8. The method of claim 1, wherein a total frequency count of each of the non-HHH nodes is propagated by splitting the total frequency count and propagating a split portion of the total frequency count to its corresponding parent nodes.

9. The method of claim 1, further comprising:
propagating the frequency counts of each of the non-HHH parent nodes to a corresponding common grandparent node.

10. The method of claim 9, wherein the common grandparent node includes a compensating count to prevent overcounting of the frequency counts from the parent frequency counts.

11. A method, comprising:
receiving a plurality of elements of a data stream;
storing a multi-dimensional data structure in a memory, said multi-dimensional data structure storing the plurality of elements as a hierarchy of nodes, each node having a frequency count corresponding to the number of elements stored therein;
comparing the frequency count of each node to a threshold value based on a total number of the elements stored in the nodes and identifying each node for which the frequency count is at least as great as the threshold value as a hierarchical heavy hitter (HHH) node;
propagating the frequency count of each non-HHH nodes to its corresponding parent nodes;
determining whether one of the nodes corresponds to one of the received elements;
when a node is determined to correspond to the one of the received elements, inserting the one of the received elements into the corresponding node; and
incrementing the frequency count of the corresponding node by an amount equal to the frequency count of the one of the received elements.

12. The method of claim 11, further comprising:
creating a new node corresponding to each received element for which there is no corresponding node.

13. A system, comprising:
a receiving element receiving a plurality of elements of a data stream;
a storage element storing a multi-dimensional data structure in a memory, said multi-dimensional data structure storing the plurality of elements as a hierarchy of nodes, each node having a frequency count corresponding to a number of elements stored therein;
a comparator element comparing the frequency count of each node to a threshold value based on a total number of the elements stored in the nodes, wherein, when the frequency count is at least as great as the fraction, the node is identified as a hierarchical heavy hitter (HHH) node; and
a propagation element propagating the frequency count of each non-HHH node to its corresponding parent nodes and propagating the frequency counts of parent nodes to a common grandparent node, wherein the common grandparent node includes a compensating count to prevent overcounting of the frequency counts from the parent nodes.

14. The system of claim 13, wherein the compensating counts include a positive compensating count and a negative compensating count.

15. The system of claim 13, wherein the frequency count of each node differs from an actual frequency count by less than a specified error factor.

16. The system of claim 13, wherein the HHH nodes are identified from one of streaming data and static data.

17. A computer readable storage medium including a set of instructions executable by a processor, the set of instructions configured to:
receive a plurality of elements of a data stream;
store a multi-dimensional data structure in a memory, said multi-dimensional data structure storing the plurality of elements as a hierarchy of nodes, each node having a frequency count corresponding to a number of elements stored therein;
compare the frequency count of each node to a threshold value based on a total number of the elements stored in the plurality of nodes, wherein, when the frequency count is at least as great as the threshold value, the node is identified as a hierarchical heavy hitter (HHH) node; and
propagate the frequency count of each non-HHH node to its corresponding parent nodes, wherein the frequency count of each non-HHH node is propagated by splitting the total frequency count and propagating a split portion of the total frequency count to its parent nodes.

* * * * *